United States Patent
Li et al.

(10) Patent No.: US 11,748,659 B2
(45) Date of Patent: Sep. 5, 2023

(54) MACHINE LEARNING APPARATUS, MACHINE LEARNING METHOD, AND INDUSTRIAL MACHINE

(71) Applicant: FANUC CORPORATION, Yamanashi (JP)

(72) Inventors: Zhenxing Li, Yamanashi-ken (JP); Hiroshi Minami, Yamanashi-ken (JP); Keita Hada, Yamanashi-ken (JP); Kazuomi Maeda, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 586 days.

(21) Appl. No.: 17/027,480

(22) Filed: Sep. 21, 2020

(65) Prior Publication Data
US 2021/0097440 A1      Apr. 1, 2021

(30) Foreign Application Priority Data
Sep. 27, 2019    (JP) ................. 2019-176341

(51) Int. Cl.
*G06N 20/00*    (2019.01)
*G05B 19/404*   (2006.01)

(52) U.S. Cl.
CPC .......... *G06N 20/00* (2019.01); *G05B 19/404* (2013.01); *G05B 2219/37634* (2013.01); *G05B 2219/49048* (2013.01); *G05B 2219/49065* (2013.01); *G05B 2219/49176* (2013.01)

(58) Field of Classification Search
CPC ............... G06N 20/00; G05B 19/404; G05B 2219/37634; G05B 2219/49176; G05B 2219/49048; G05B 2219/49065
See application file for complete search history.

(56) References Cited

U.S. PATENT DOCUMENTS

| | | | | |
|---|---|---|---|---|
| 10,697,822 | B2* | 6/2020 | Rothwell | G01K 1/026 |
| 11,226,599 | B2* | 1/2022 | Maeda | G05B 13/042 |
| 11,460,827 | B2* | 10/2022 | Watanabe | G06N 5/045 |
| 11,629,775 | B2* | 4/2023 | Li | F16F 15/027 |
| | | | | 248/638 |

(Continued)

FOREIGN PATENT DOCUMENTS

| | | |
|---|---|---|
| JP | 01-053210 A | 3/1989 |
| JP | 64-053210 A | 3/1989 |

(Continued)

*Primary Examiner* — Anita M King
(74) *Attorney, Agent, or Firm* — Robert P. Michal, Esq.; Carter, DeLuca & Farrell LLP (57) ABSTRACT

A machine learning apparatus determines a control parameter of an active vibration isolation apparatus on which an industrial machine is mounted. The industrial machine includes a movable part, a drive source that drives the movable part, and a drive source control section that controls the drive source to position the movable part at a command position. The machine learning apparatus includes: an acquiring section that acquires, as teacher data, a positional deviation, which is a difference between the command position and an actual position of the movable part; a storage section that stores a learning model that outputs the control parameter corresponding to a state quantity concerning the industrial machine; and a learning section that updates the learning model using the teacher data.

13 Claims, 3 Drawing Sheets

(56) References Cited

U.S. PATENT DOCUMENTS

| | | | |
|---|---|---|---|
| 2015/0069205 A1 | 3/2015 | Moneer et al. | |
| 2015/0142182 A1* | 5/2015 | Kimura | F16F 15/002 |
| | | | 248/550 |
| 2017/0176244 A1* | 6/2017 | Fujita | G01H 17/00 |
| 2019/0389023 A1* | 12/2019 | Kato | G05B 19/404 |
| 2021/0080922 A1* | 3/2021 | Kurokawa | G05B 19/404 |
| 2021/0223803 A1* | 7/2021 | Miyaji | G05B 19/404 |

FOREIGN PATENT DOCUMENTS

| | | |
|---|---|---|
| JP | 07-310780 A | 11/1995 |
| JP | 2003-022958 A | 1/2003 |
| JP | 2008115966 A | 5/2008 |
| JP | 6567811 A | 8/2019 |

* cited by examiner

MACHINE LEARNING APPARATUS, MACHINE LEARNING METHOD, AND INDUSTRIAL MACHINE

CROSS-REFERENCE TO RELATED APPLICATION

This application is based upon and claims the benefit of priority from Japanese Patent Application No. 2019-176341 filed on Sep. 27, 2019, the contents of which are incorporated herein by reference.

BACKGROUND OF THE INVENTION

Field of the Invention

The present invention relates to a machine learning apparatus, a machine learning method, and an industrial machine.

Description of the Related Art

Japanese Laid-Open Patent Publication No. 2003-022958 discloses a vibration isolation apparatus including a state determining unit. In Japanese Laid-Open Patent Publication No. 2003-022958, the state determining unit makes a state determination using signals output from a vibration detecting unit and a displacement detecting unit and a signal stored in memory, and changes the setting of a control parameter or the like of the vibration isolation apparatus based on the result of the state determination.

SUMMARY OF THE INVENTION

However, Japanese Laid-Open Patent Publication No. 2003-022958 merely discloses simply changing the setting of the control parameter or the like based on the state determination result, and cannot necessarily set a favorable control parameter.

It is an object of the present invention to provide a machine learning apparatus, a machine learning method, and an industrial machine that can suitably determine a control parameter of an active vibration isolation apparatus without requiring complicated work.

A machine learning apparatus according to one aspect of the present invention is a machine learning apparatus that determines a control parameter of an active vibration isolation apparatus on which an industrial machine is mounted, wherein the industrial machine includes a movable part, a drive source configured to drive the movable part, and a drive source control section configured to control the drive source to position the movable part at a command position, the machine learning apparatus comprising an acquiring section configured to acquire, as teacher data, a positional deviation, which is a difference between the command position and an actual position of the movable part; a storage section configured to store a learning model configured to output the control parameter corresponding to a state quantity concerning the industrial machine; and a learning section configured to update the learning model using the teacher data.

An industrial machine according to another aspect of the present invention comprises the machine learning apparatus described above.

A machine learning method according to yet another aspect of the present invention is a machine learning method for determining a control parameter of an active vibration isolation apparatus on which an industrial machine is mounted, wherein the industrial machine includes a movable part, a drive source configured to drive the movable part, and a drive source control section configured to control the drive source to position the movable part at a command position, the machine learning method comprising an acquiring step of acquiring, as teacher data, a positional deviation, which is a difference between the command position and an actual position of the movable part; and a step of updating a learning model using the teacher data, the learning model being configured to output the control parameter corresponding to a state quantity concerning the industrial machine.

According to the present invention, it is possible to provide a machine learning apparatus, a machine learning method, and an industrial machine that can suitably determine a control parameter of an active vibration isolation apparatus without requiring complicated work.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The following describes in detail preferred embodiments of a machine learning apparatus, a machine learning method, and an industrial machine according to the present invention, while referencing the accompanying drawings.

Embodiment

Figure 1:
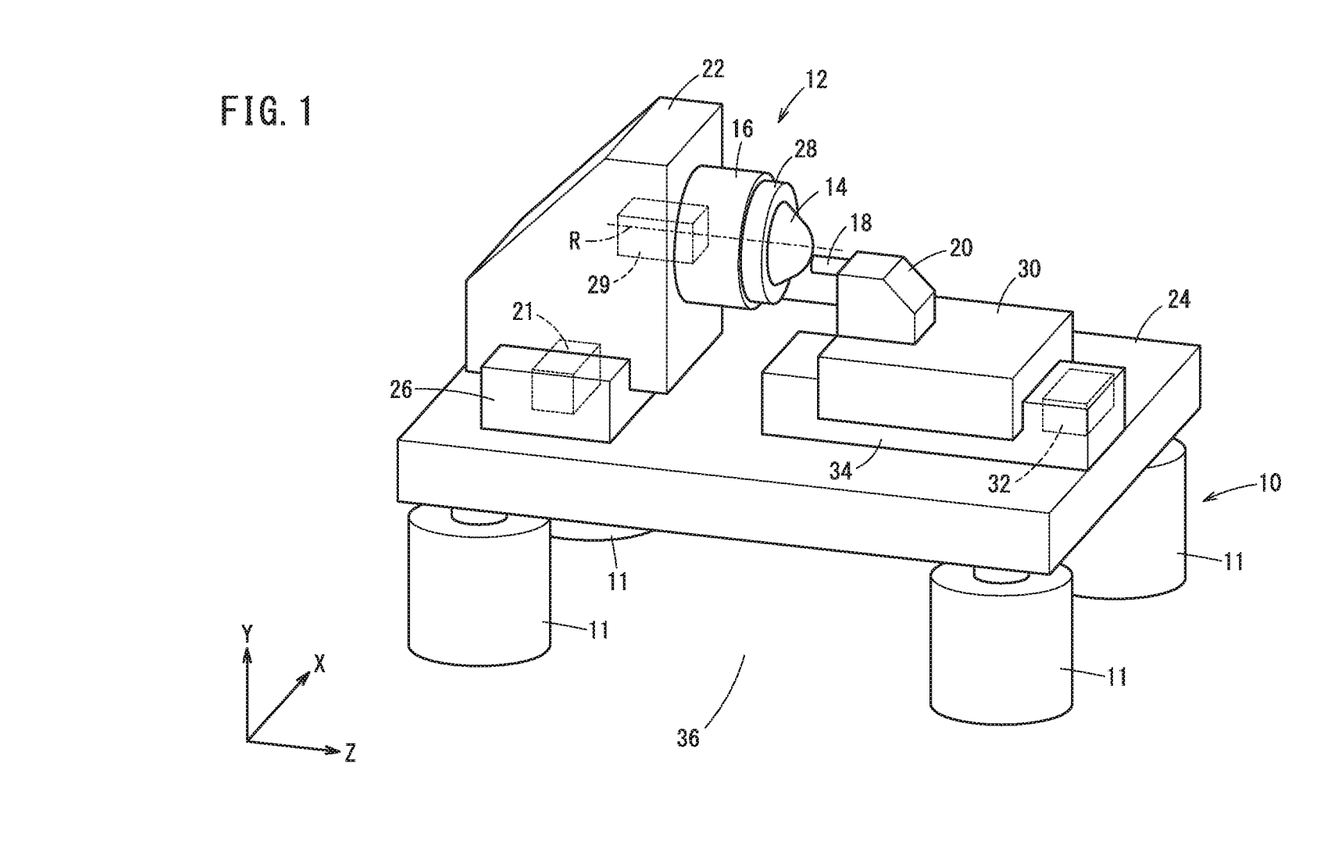
FIG. 1 is a schematic view of an industrial machine according to a present embodiment.
Figure 2:
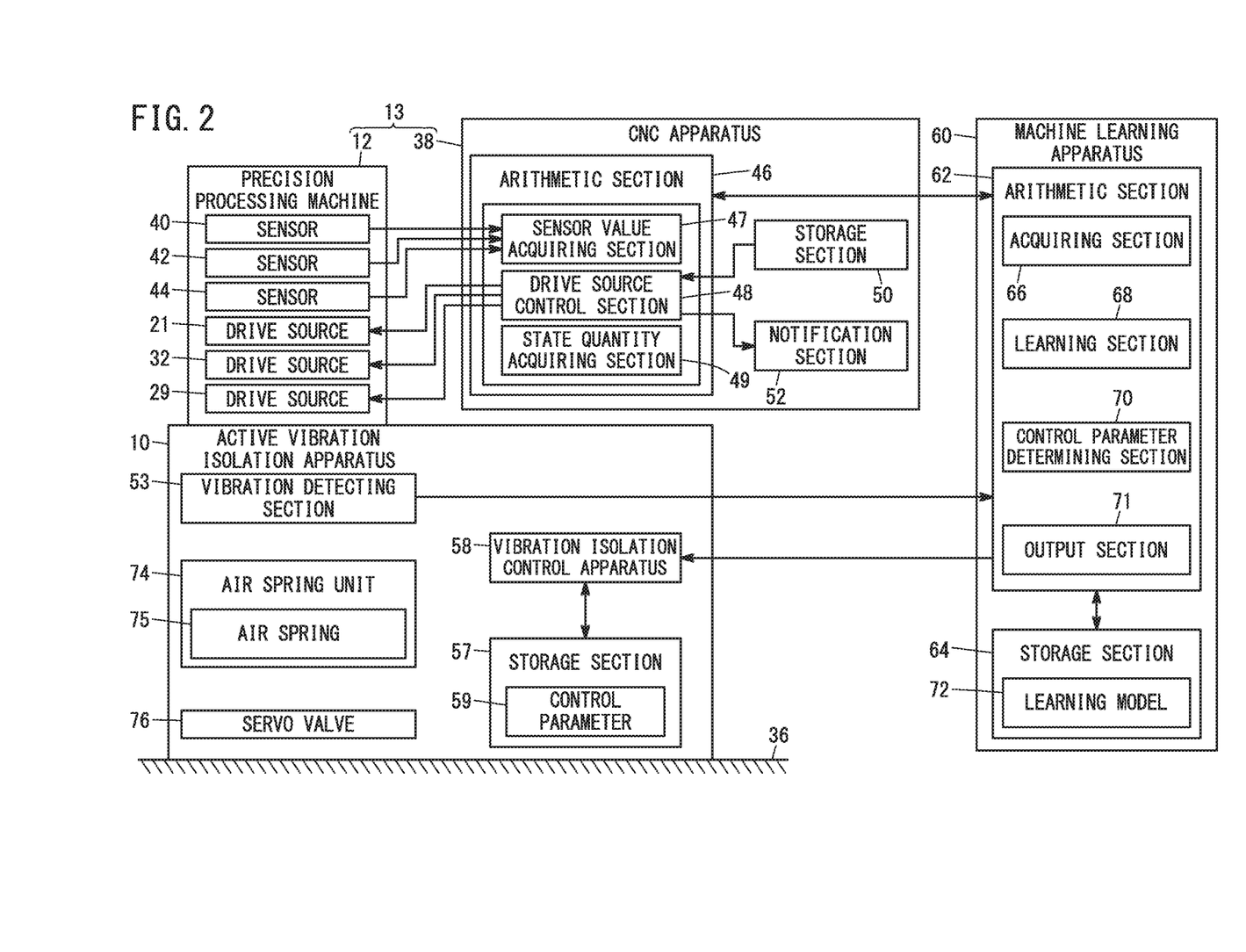
FIG. 2 is a block diagram showing an active vibration isolation apparatus, a machine learning apparatus, and the industrial machine according to the present embodiment.
Figure 3:
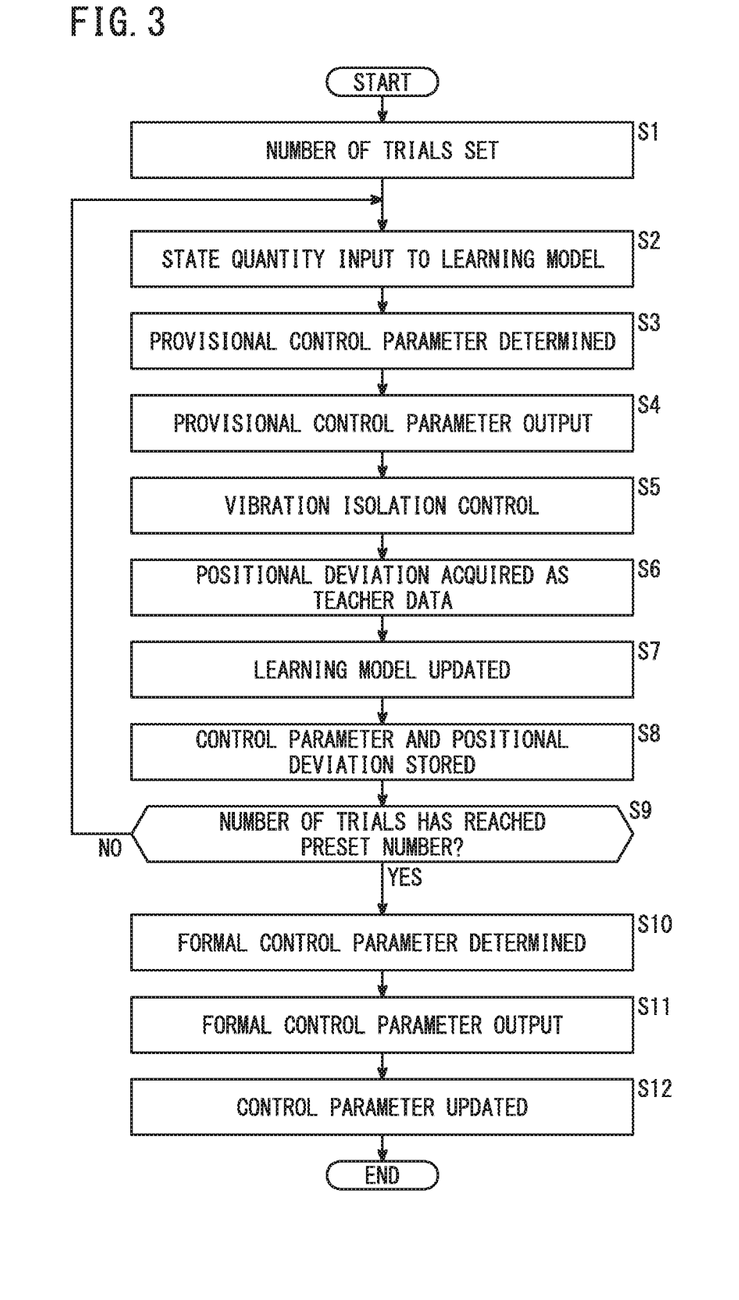
FIG. 3 is a flow chart showing an operation of the machine learning apparatus according to the present embodiment.

The following describes a machine learning apparatus, a machine learning method, and an industrial machine according to an embodiment, using FIGS. 1 to 3. FIG. 1 is a schematic view of the industrial machine according to the present embodiment. In the present embodiment, an example is described of a case in which an industrial machine 13 (see FIG. 2) is formed by a precision processing machine 12 and a CNC (Computerized Numerical Control) apparatus 38 (see FIG. 2), but the configuration of the industrial machine 13 is not limited to this. At least a portion of the industrial machine 13 according to the present embodiment can be mounted on an active vibration isolation apparatus 10. FIG. 1 shows an example of a case in which the precision processing machine 12, which is a portion of the industrial machine 13, is mounted on the active vibration isolation apparatus 10. The CNC apparatus 38 is omitted from being shown in FIG. 1.

The active vibration isolation apparatus 10, i.e. the active damper, includes a vibration isolation platform (vibration isolation table) 24 on which the precision processing machine 12 is mounted, and a plurality of leg portions 11 that support the vibration isolation platform 24 on a floor 36.

Here, an example is described of a case in which the leg portions 11 are provided at the four corners of the vibration isolation platform 24, but the present invention is not limited to this. The active vibration isolation apparatus 10 can reduce the vibration transmitted from the floor 36 to the precision processing machine 12.

The precision processing machine 12 is an ultra-high precision machine tool that can machine a workpiece 14 with a machine accuracy of 100 nm or less according to a machining command, for example. The precision processing machine 12 includes a spindle (movable part) 16 that can rotate around an R-axis. The spindle 16 can fix the workpiece 14 thereto in a detachable manner. The precision processing machine 12 further includes a tool platform 20 to which a tool 18 is detachably fixed.

The spindle 16 is supported by an X-axis movable part (movable part) 22 that can be driven in the X-axis direction. The X-axis movable part 22 can be driven by a drive source 21. A servo motor or the like, for example, can be used as the drive source 21, but the present invention is not limited to this. The X-axis movable part 22 can be driven in the X-axis direction along an X-axis guide 26 that is fixed to the vibration isolation platform 24. A fluid bearing (not shown in the drawings), for example, is provided between the X-axis guide 26 and the X-axis movable part 22. There is only a very small amount of friction between the X-axis guide 26 and the X-axis movable part 22.

The spindle 16 includes a vacuum chuck 28. The workpiece 14 can be fixed to the spindle 16 by the vacuum chuck 28. The spindle 16 can be driven by a drive source 29. A servo motor or the like, for example, can be used as the drive source 29, but the present invention is not limited to this. As described above, the spindle 16 can rotate around the R-axis. A fluid bearing (not shown in the drawings), for example, is provided between the movable part 22 and the spindle 16. There is only a very small amount of friction between the movable part 22 and the spindle 16.

The tool platform 20 is supported by a Z-axis movable part (movable part) 30 that can be driven in a Z-axis direction. The Z-axis movable part 30 can be driven by a drive source 32. A servo motor or the like, for example, can be used as the drive source 32, but the present invention is not limited to this. The Z-axis movable part 30 can be driven in the Z-axis direction along a Z-axis guide 34 that is fixed to the vibration isolation platform 24. A fluid bearing (not shown in the drawings), for example, is provided between the Z-axis guide 34 and the movable part 30. There is only a very small amount of friction between the Z-axis guide 34 and the movable part 30.

In a case where the drive sources 21, 29, and 32 are each formed by a servo motor, the drives sources 21, 29, and 32 each include a servo amplifier (not shown in the drawings) for driving these drive sources.

FIG. 2 is a block diagram showing the active vibration isolation apparatus, the machine learning apparatus, and the industrial machine according to the present embodiment. As described above, the industrial machine 13 is formed by the precision processing machine 12 and the CNC apparatus 38, for example. A machine learning apparatus 60 can be connected to the industrial machine 13 and the active vibration isolation apparatus 10 when a readjustment of vibration isolation characteristics of the active vibration isolation apparatus 10 is to be performed. When there is no need to perform a readjustment of the vibration isolation characteristics of the active vibration isolation apparatus 10, the machine learning apparatus 60 can be removed from the industrial machine 13 and the active vibration isolation apparatus 10. Here, an example is described of a case in which the CNC apparatus 38 and the industrial machine 13 are formed by separate apparatuses, but the machine learning apparatus 60 may be incorporated in the industrial machine 13. For example, the machine learning apparatus 60 may be incorporated in the CNC apparatus 38.

As shown in FIG. 2, the precision processing machine 12 includes a sensor 40. The sensor 40 can detect the position of the X-axis movable part 22 on the X-axis guide 26. The sensor 40 can be formed by a linear scale, for example, but is not limited to this. The resolution of the linear scale that can be used as the sensor 40 is 10 nm or less, for example.

The precision processing machine 12 further includes a sensor 42. The sensor 42 can detect the position of the movable part 30 on the Z-axis guide 34. The sensor 42 can be formed by a linear scale, for example, but is not limited to this. The resolution of the linear scale that can be used as the sensor 42 is 10 nm or less, for example.

The precision processing machine 12 further includes a sensor 44. The sensor 44 can detect the rotational position of the spindle 16 around the R-axis. The sensor 44 can be formed by an encoder, for example, but is not limited to this. The resolution of the encoder that can be used as the sensor 44 is 1/10,000 of a degree or less, for example.

The information output from each of the sensors 40, 42, and 44, i.e. the sensor values, can be supplied to a sensor value acquiring section 47 described further below.

The active vibration isolation apparatus 10 includes a vibration detecting section 53. The vibration detecting section 53 can detect vibration transmitted to the active vibration isolation apparatus 10 from the floor 36, for example. Furthermore, the vibration detecting section 53 can detect vibration transmitted from the active vibration isolation apparatus 10 to the vibration isolation platform 24. The vibration detected by the vibration detecting section 53 can be supplied to the machine learning apparatus 60. Here, an example is described of a case in which the vibration detected by the vibration detecting section 53 is supplied to the machine learning apparatus 60, but the present invention is not limited to this. The vibration detected by a vibration detecting section that is separate from the vibration detecting section 53 may be supplied to the machine learning apparatus 60. The vibration detecting section that is separate from the vibration detecting section 53 can be provided to be capable of detecting vibration of the precision processing machine 12.

The active vibration isolation apparatus 10 further includes an air spring unit 74 for lifting up the vibration isolation platform 24. The air spring unit 74 is provided in each of the plurality of leg portions 11, but FIG. 2 shows only one air spring unit 74. Each air spring unit 74 includes an air spring 75. A plurality of the air springs 75 are provided for each air spring unit 74, but FIG. 2 shows only one air spring 75. The internal pressure of the air spring 75 can be detected by an air pressure sensor (not shown in the drawings).

The active vibration isolation apparatus 10 further includes a servo valve 76 for actively controlling the air spring unit 74. The servo valve 76 is provided for each of the plurality of leg portions 11, but FIG. 2 shows only one servo valve 76.

The active vibration isolation apparatus 10 further includes a vibration isolation control apparatus 58. The vibration isolation control apparatus 58 can be formed by a CPU (Central Processing Unit) or the like, for example, but is not limited to this. The vibration isolation control apparatus 58 controls the air spring unit 74 by controlling the servo valve 76, and can thereby control the position of the vibration isolation platform 24 in a vertical direction and the position of the vibration isolation platform 24 in a horizontal direction. The vibration isolation control apparatus 58 performs vibration isolation control by appropriately controlling the air spring unit 74 based on the vibration detected by the vibration detecting section 53 and a control parameter 59, which is described further below.

The active vibration isolation apparatus 10 further includes a storage section 57. The storage section 57 includes a volatile memory (not shown in the drawings) and a nonvolatile memory (not shown in the drawings), for example. A RAM (Random Access Memory) or the like, for example, can be used as the volatile memory. A ROM (Read Only Memory), flash memory, or the like, for example, can be used as the nonvolatile memory. Programs, data, tables, and the like can be stored in the storage section 57. Furthermore, the control parameters 59 of the active vibration isolation apparatus 10 are stored in the storage section 57.

The control parameters 59 of the active vibration isolation apparatus 10 are used for setting the vibration isolation characteristics of the active vibration isolation apparatus 10. The control parameters 59 can include, for example, the internal pressure of the air spring 75 for lifting up the vibration isolation platform 24 provided in the active vibration isolation apparatus 10. The control parameters 59 can include a drive amount of the servo valve 76 for actively controlling the air spring 75, for example. The control parameters 59 can include a target position of the air spring unit 74 that includes the air spring 75. This target position is a target position in the vertical direction and a target position in the horizontal direction, for example. The control parameters 59 can include the feedback gain of the control of the active vibration isolation apparatus 10, for example. In the case of PI (Proportional-Integral) control, the control feedback gain can include the proportional gain and the integral gain. The control parameters 59 can include setting values for a filter (not shown in the drawings) provided in the active vibration isolation apparatus 10, for example. More specifically, this filter is provided in a control circuit provided in the vibration isolation control apparatus 58. A high-pass filter or the like, for example, can be used as the filter, but the filter is not limited to this. A filter time constant, cutoff frequency, and the like, for example, can be used as the setting values for the filter, but the setting values are not limited to this. The control parameters 59 do not need to include all of the above examples. The control parameters 59 can include at least any one of the above examples.

As described further below, when an installation environment or the like of the industrial machine 13 has changed, it can be necessary to readjust the vibration isolation characteristics of the active vibration isolation apparatus 10. The readjustment of the vibration isolation characteristics of the active vibration isolation apparatus 10 can be performed by resetting the control parameter 59. The details of the resetting of the control parameter 59 are described in detail further below.

The CNC apparatus 38 can perform numerical control on the precision processing machine 12, according to a prescribed machining program. The CNC apparatus 38 is capable of communicating wirelessly or in a wired manner with the vibration isolation control apparatus 58 of the active vibration isolation apparatus 10. Furthermore, the CNC apparatus 38 is capable of communicating wirelessly or in a wired manner with the machine learning apparatus 60. The CNC apparatus 38 includes an arithmetic section 46, a storage section 50, and a notification section 52.

The arithmetic section 46 includes the sensor value acquiring section 47, a drive source control section 48, and a state quantity acquiring section 49. The arithmetic section 46 can be formed by a CPU or the like, for example, but is not limited to this. The sensor value acquiring section 47, the drive source control section 48, and the state quantity acquiring section 49 can be realized by having the arithmetic section 46 execute a program stored in the storage section 50.

The sensor value acquiring section 47 can obtain the information supplied from each of the sensors 40, 42, and 44, i.e. the sensor values. The sensor values acquired by the sensor value acquiring section 47 can be supplied to the drive source control section 48.

The drive source control section 48 can control the drive source 21 to position the movable part 22 at a command position on the X-axis guide 26.

The arithmetic section 46 can calculate a positional deviation that is a difference between the command position on the X-axis guide 26 and the actual position of the movable part 22 on the X-axis, i.e. the positional deviation in the X-axis direction. The arithmetic section 46 can supply the machine learning apparatus 60 with the positional deviation in the X-axis direction calculated in this way.

The drive source control section 48 can control the drive source 32 to position the movable part 30 at a command position on the Z-axis guide 34. The arithmetic section 46 can calculate a positional deviation that is a difference between the command position on the Z-axis guide 34 and the actual position of the movable part 30 on the Z-axis, i.e. the positional deviation in the Z-axis direction. The arithmetic section 46 can supply the machine learning apparatus 60 with the positional deviation in the Z-axis direction calculated in this way.

The drive source control section 48 can control the drive source 29 to position the spindle 16 at a command position around the R-axis. The arithmetic section 46 can calculate a positional deviation that is a difference between the command position around the R-axis and the actual position of the spindle 16, i.e. the positional deviation around the R-axis. The arithmetic section 46 can supply the machine learning apparatus 60 with the positional deviation around the R-axis calculated in this way.

The state quantity acquiring section 49 can acquire a state quantity concerning the industrial machine 13. The state quantity concerning the industrial machine 13 is information indicating the installation environment or the like of the industrial machine 13. The state quantity concerning the industrial machine 13 can include the strength of the floor 36 on which the industrial machine 13 is installed via the active vibration isolation apparatus 10. The state quantity concerning the industrial machine 13 can include a positional relationship between the industrial machine 13 and another machine (not shown in the drawings). The state quantity concerning the industrial machine 13 can include the mass of the workpiece 14. The state quantity concerning the industrial machine 13 can include the ambient temperature of the industrial machine 13. The state quantity concerning the industrial machine 13 can include wind pressure experienced by the industrial machine 13. The state quantity concerning the industrial machine 13 can include the sound surrounding the industrial machine 13. The state quantity concerning the industrial machine 13 can include vibration applied to the industrial machine 13. The state quantity concerning the industrial machine 13 does not need to include all of the above examples. The state quantity concerning the industrial machine 13 can include at least any one of the above examples. The state quantity acquiring section 49 can acquire these state quantities concerning the industrial machine 13 using a sensor or the like (not shown in the drawings). Furthermore, the state quantity acquiring section 49 can acquire these state quantities concerning the industrial machine 13 based on information input by a user using an input unit (not shown in the drawings). Here, an example is described of a case in which the state quantity acquiring section 49 is provided in the CNC apparatus 38, but the present invention is not limited to this. For example, at least a portion of the state quantity acquiring section 49 may be included in the machine learning apparatus 60. Furthermore, at least a portion of the state quantity acquiring section 49 may be provided separately from the industrial machine 13 and the machine learning apparatus 60.

The storage section 50 includes a volatile memory (not shown in the drawings) and a nonvolatile memory (not shown in the drawings), for example. A RAM or the like, for example, can be used as the volatile memory. A ROM, flash memory, or the like, for example, can be used as the nonvolatile memory. Programs, data, tables, and the like can be stored in the storage section 50.

The notification section 52 can be formed by an audio apparatus (not shown in the drawings) that can output sound, for example. The notification section 52 may be formed by a display apparatus (not shown in the drawings) that can display images, characters, and the like. The notification section 52 may be formed by both the audio apparatus and the display apparatus. When a positional deviation exceeds an allowance (threshold), the arithmetic section 46 can notify the user of information indicating that the positional deviation has exceeded the allowance, using the notification section 52. The allowance can be approximately 10 nm, for example, but is not limited to this.

The machine learning apparatus 60 can update a learning model 72 that outputs a control parameter corresponding to a state quantity concerning the industrial machine 13. The update of the learning model 72 can be performed when the installation environment of the industrial machine 13 has changed, for example. As described above, the machine learning apparatus 60 is capable of communicating wirelessly or in a wired manner with the CNC apparatus 38. Furthermore, the machine learning apparatus 60 is capable of communicating wirelessly or in a wired manner with the active vibration isolation apparatus 10.

The machine learning apparatus 60 includes an arithmetic section 62 and a storage section 64. The arithmetic section 62 includes an acquiring section 66, a learning section 68, a control parameter determining section 70, and an output section 71. The arithmetic section 62 can be formed by a CPU or the like, for example, but is not limited to this. For example, the arithmetic section 62 may be formed by an ASIC (Application Specific Integrated Circuit), a GPU (Graphics Processing Unit), or the like.

The storage section 64 includes a volatile memory (not shown in the drawings) and a nonvolatile memory (not shown in the drawings), for example. A RAM or the like, for example, can be used as the volatile memory. A ROM, flash memory, or the like, for example, can be used as the nonvolatile memory. Programs, data, tables, and the like can be stored in the storage section 64. Furthermore, as described further below, the learning model 72 can be stored in the storage section 64.

The acquiring section 66, the learning section 68, the control parameter determining section 70, and the output section 71 can be realized by having the arithmetic section 62 execute a program stored in the storage section 64.

The acquiring section 66 can acquire the positional deviations supplied from the arithmetic section 46 as teacher data. As described above, the positional deviations are the differences between the command positions and the actual positions of the movable parts 16, 22, and 30. The acquiring section 66 may further acquire information indicating the vibration of the active vibration isolation apparatus 10 as the teacher data. More specifically, the acquiring section 66 may further acquire the information acquired by the vibration detecting section 53 as the teacher data. The acquiring section 66 supplies the learning section 68 with the teacher data acquired in this way.

The learning model 72 can be stored in the storage section 64. The learning model 72 is a model that receives, as input, a state quantity concerning the industrial machine 13 and outputs a control parameter of the active vibration isolation apparatus 10. The learning model 72 is a learning model generated using the positional deviation as teacher data. The learning model 72 can output a control parameter corresponding to a state quantity concerning the industrial machine 13. A control parameter provisionally used in a process such as described below and the positional deviation when vibration isolation control is performed using this control parameter can be stored in association with each other in the storage section 64. The information indicating the vibration of the active vibration isolation apparatus 10 may also be stored in the storage section 57 in association with the above control parameter and positional deviation.

The learning section 68 can update the learning model 72. The update of the learning model 72 is described in detail below. The generation of the learning model 72 may be performed by the learning section 68. The learning section 68 updates the learning model 72 using the teacher data acquired by the acquiring section 66, using a known machine learning algorithm. An algorithm employing a regression technique, for example, can be used as the machine learning algorithm executed by the learning section 68, but the present invention is not limited to this. The learning section 68 can store, in the storage section 64, the learning model 72 updated by a process such as described further below.

The control parameter determining section 70 can determine a control parameter output from the learning model 72 according to a state quantity concerning the industrial machine 13, as a provisional control parameter for performing machine learning. The control parameter determining section 70 can determine an optimal control parameter that minimizes the positional deviation, as a formal control parameter.

The output section 71 can output, to the vibration isolation control apparatus 58, the provisional control parameter determined by the control parameter determining section 70. Furthermore, the output section 71 can output, to the vibration isolation control apparatus 58, the formal control parameter determined by the control parameter determining section 70.

When the installation environment or the like of the industrial machine 13 has changed, it can be necessary to readjust the vibration isolation characteristics of the active vibration isolation apparatus 10. For example, when the strength of the floor 36 on which the industrial machine 13 is installed via the active vibration isolation apparatus 10 has changed, it can be necessary to readjust the vibration isolation characteristics of the active vibration isolation apparatus 10. Furthermore, in a case where the positional relationship between the industrial machine 13 and another machine (not shown in the drawings) has changed, it can also be necessary to readjust the vibration isolation characteristics of the active vibration isolation apparatus 10. In a case where the mass of the workpiece 14 has changed, it can also be necessary to readjust the vibration isolation characteristics of the active vibration isolation apparatus 10. In a case where the ambient temperature of the industrial machine 13 has changed, it can also be necessary to readjust the vibration isolation characteristics of the active vibration isolation apparatus 10. In a case where the wind pressure experienced by the industrial machine 13 has changed, it can also be necessary to readjust the vibration isolation characteristics of the active vibration isolation apparatus 10. In a case where the sound surrounding the industrial machine 13 has changed, it can also be necessary to readjust the vibration isolation characteristics of the active vibration isolation apparatus 10. In a case where the vibration applied to the industrial machine 13 has changed, it can also be necessary to readjust the vibration isolation characteristics of the active vibration isolation apparatus 10. The readjustment of the vibration isolation characteristics of the active vibration isolation apparatus 10 may be performed by resetting a control parameter of the active vibration isolation apparatus 10.

The control parameters corresponding to the installation environment or the like of the industrial machine 13, i.e. the control parameters corresponding to the state quantities concerning the industrial machine 13, can be acquired using the learning model 72. However, in a case where the installation environment or the like of the industrial machine 13 has changed, even when a state quantity indicating the installation environment or the like after the change is input to the learning model 72, a suitable control parameter may not always be output from this learning model 72. Accordingly, in the present embodiment, in a case where the installation environment or the like of the industrial machine 13 has changed, the learning model 72 is updated in a manner to output a control parameter that causes the positional deviation to become less than or equal to the allowance, by performing machine learning using the positional deviation as the teacher data. The control parameter corresponding to the installation environment or the like after the change is then acquired using the updated learning model 72.

The update of the learning model 72 is performed as described below. Specifically, first, the state quantity corresponding to the installation environment or the like after the change is acquired by the state quantity acquiring section 49, and the acquired state quantity is supplied to the machine learning apparatus 60. The learning section 68 determines the control parameter corresponding to this state quantity, using the learning model 72 that is stored in advance in the storage section 64. That is, the learning section 68 inputs the state quantity supplied from the state quantity acquiring section 49 into the learning model 72. When the state quantity is input to the learning model 72, the control parameter corresponding to this state quantity is output from the learning model 72. The machine learning apparatus 60 supplies the active vibration isolation apparatus 10 with the control parameter output from the learning model 72. At this time, the control parameter supplied from the machine learning apparatus 60 to the active vibration isolation apparatus 10 is a provisional control parameter for verifying the validity of this control parameter. The active vibration isolation apparatus 10 performs the vibration isolation control based on the provisional control parameter supplied from the machine learning apparatus 60. If the positional deviation exceeds the allowance, the learning model 72 that has output this control parameter is a learning model that requires further machine learning. On the other hand, if the positional deviation is less than or equal to the allowance, the learning model 72 that has output this control parameter is a learning model that does not necessarily require further machine learning. The learning section 68 continually updates the learning model 72 in a manner to become able to output a control parameter that reduces the positional deviation, by performing machine learning with the positional deviation as the teacher data.

The learning section 68 stores the updated learning model 72 in the storage section 64. The control parameter determining section 70 can determine an optimal control parameter that minimizes the positional deviation, as the formal control parameter. The output section 71 supplies the vibration isolation control apparatus 58 with the control parameter determined by the control parameter determining section 70. The vibration isolation control apparatus 58 updates the control parameter 59 stored in the storage section 57, with the control parameter supplied from the output section 71. In this way, the control parameter corresponding to the installation environment or the like after the change is acquired using the updated learning model 72.

The vibration isolation characteristics of the active vibration isolation apparatus 10 are updated by updating the control parameter 59. The vibration isolation control apparatus 58 performs the vibration isolation control based on the vibration detected by the vibration detecting section 53 and the updated control parameter 59.

FIG. 3 is a flow chart showing an operation of the machine learning apparatus according to the present embodiment.

At step S1, the number of trials to be performed is set. The setting of the number of trials may be set automatically by the learning section 68, or may be set based on information input by a user using an input unit (not shown in the drawings). The setting for the number of trials can be approximately 100 times, for example, but is not limited to this. After this, the process moves to step S2.

At step S2, the learning section 68 inputs the state quantity supplied from the state quantity acquiring section 49 to the learning model 72. When the state quantity is input to the learning model 72, the control parameter corresponding to this state quantity is output from the learning model 72. After this, the process moves to step S3.

At step S3, the control parameter determining section 70 determines the control parameter output from the learning model 72, as the provisional control parameter. After this, the process moves to step S4.

At step S4, the output section 71 outputs the provisional control parameter determined by the control parameter determining section 70 to the vibration isolation control apparatus 58. After this, the process moves to step S5.

At step S5, the vibration isolation control apparatus 58 performs the vibration isolation control, based on the provisional control parameter supplied from the output section 71 and the vibration detected by the vibration detecting section 53. After this, the process moves to step S6.

At step S6, the acquiring section 66 acquires the positional deviation as the teacher data. The measurement for obtaining the positional deviation may be performed a plurality of times and the positional deviation may be acquired using a statistical method such as the root mean square. The acquiring section 66 may further acquire the information indicating the vibration of the active vibration isolation apparatus 10, as the teacher data. After this, the process moves to step S7.

At step S7, the learning section 68 updates the learning model 72, by performing machine learning that uses the teacher data. After this, the process moves to step S8.

At step S8, the learning section 68 performs a process such as shown below. Specifically, in a case where it is the first time that the positional deviation has become less than or equal to the allowance, the learning section 68 stores the control parameter that was used provisionally and the positional deviation that occurred when the vibration isolation control was performed using this control parameter, in association with each other in the storage section 57. In a case where the positional deviation has become less than or equal to the allowance but not for the first time, the learning section 68 performs a process such as shown below. In a case where a positional deviation is acquired that is less than or equal to the allowance and also less than the previously acquired positional deviation, the learning section 68 stores the control parameter that was used provisionally and the positional deviation that occurred when the vibration isolation control was performed using this control parameter, in association with each other in the storage section 57. The provisional control parameter that was used previously and the positional deviation that occurred when the vibration isolation control was performed using this control parameter are updated with a new provisional control parameter and a positional deviation that occurred when the vibration isolation control was performed using this control parameter. In this way, the provisional control parameter that reduces the positional deviation and the positional deviation that occurred when the vibration isolation control was performed using this control parameter are stored in the storage section 57. The information indicating the vibration of the active vibration isolation apparatus 10 may also be stored in the storage section 57 in association with the above control parameter and positional deviation. After this, the process moves to step S9.

At step S9, the learning section 68 determines whether the number of trials has reached the preset number. If the number of trials has reached the preset number (YES at step S9), the process moves to step S10. If the number of trials has not reached the preset number (NO at step S9), the processing of step S2 and onward is repeated.

At step S10, the control parameter determining section 70 determines the provisional control parameter stored in the storage section 64, as the formal control parameter. Since the provisional control parameter that most reduces the positional deviation is stored in the storage section 57, the optimal control parameter can be determined as the formal control parameter. The control parameter determining section 70 may determine the formal control parameter by making a comprehensive judgment that further takes into consideration the information indicating the vibration of the active vibration isolation apparatus 10. After this, the process moves to step S11.

At step S11, the output section 71 outputs the formal control parameter determined by the control parameter determining section 70 to the active vibration isolation apparatus 10. After this, the process moves to step S12.

At step S12, the vibration isolation control apparatus 58 updates the control parameter 59 stored in the storage section 57, with the control parameter supplied from the output section 71. In this way, the process shown in FIG. 3 is completed.

In this way, according to the present embodiment, the learning model 72 that outputs a control parameter corresponding to a state quantity concerning the industrial machine 13 is updated, using the positional deviations that are the differences between the command positions and the actual positions of the movable parts 16, 22, and 30 as the teacher data. Therefore, according to the present embodiment, it is possible to suitably determine the control parameter of the active vibration isolation apparatus 10 without requiring complicated work.

While the preferred embodiments of the present invention have been described above, the present invention is not limited to the above-described embodiments, and various alterations and improvements can be added without deviating from the scope of the present invention.

The following is a summary of the embodiments described above.

A machine learning apparatus (60) determines a control parameter (59) of an active vibration isolation apparatus (10) on which an industrial machine (13) is mounted, wherein the industrial machine includes a movable part (16, 22, 30), a drive source (21, 29, 32) that drives the movable part, and a drive source control section (48) that controls the drive source to position the movable part at a command position, and the machine learning apparatus comprises an acquiring section (66) that acquires, as teacher data, a positional deviation, which is a difference between the command position and an actual position of the movable part; a storage section (64) that stores a learning model (72) that outputs the control parameter corresponding to a state quantity concerning the industrial machine; and a learning section (68) that updates the learning model using the teacher data. According to such a configuration, the learning model that outputs the control parameter corresponding to the state quantity concerning the industrial machine is updated, using the positional deviation, which is the difference between the command position and the actual position of the movable part, as the teacher data. Accordingly, with such a configuration, it is possible to suitably determine the control parameter of the active vibration isolation apparatus without requiring complicated work.

The machine learning apparatus may further comprise a control parameter determining section (70) that determines the control parameter corresponding to the state quantity, using the learning model updated by the learning section; and an output section (71) that outputs, to the active vibration isolation apparatus, the control parameter determined by the control parameter determining section.

The acquiring section may further acquire, as the teacher data, information indicating vibration of the active vibration isolation apparatus. According to such a configuration, it is possible to more suitably determine the control parameter of the active vibration isolation apparatus.

The control parameter may include at least any one of an internal pressure of an air spring (75) for lifting up a vibration isolation platform (24) provided in the active vibration isolation apparatus, a drive amount of a servo valve (76) for actively controlling the air spring, a target position of an air spring unit (74) that includes the air spring, control feedback gain of the active vibration isolation apparatus, and a setting value for a filter provided in the active vibration isolation apparatus.

The state quantity may include at least any one of strength of a floor (36) on which the industrial machine is installed via the active vibration isolation apparatus, a positional relationship between the industrial machine and another machine, mass of a workpiece (14), an ambient temperature of the industrial machine, wind pressure experienced by the industrial machine, sound surrounding the industrial machine, and vibration applied to the industrial machine.

The drive source may be a servo motor. According to such a configuration, it is possible to provide an industrial machine with high machining precision.

The industrial machine may be an ultra-high precision machine tool that machines a workpiece with a machine accuracy of 100 nm or less according to a machining command.

An industrial machine includes the machine learning apparatus such as described above.

A machine learning method is a method for determining a control parameter of an active vibration isolation apparatus on which an industrial machine is mounted, wherein the industrial machine includes a movable part, a drive source that drives the movable part, and a drive source control section that controls the drive source to position the movable part at a command position, and the machine learning method comprises an acquiring step (S6) of acquiring, as teacher data, a positional deviation, which is a difference between the command position and an actual position of the movable part; and a step (S7) of updating a learning model, which outputs the control parameter corresponding to a state quantity concerning the industrial machine, using the teacher data.

The machine learning method further comprises a step (S3) of determining the control parameter corresponding to the state quantity, using the learning model updated in the step of updating the learning model; and a step (S4) of outputting, to the active vibration isolation apparatus, the control parameter determined in the step of determining the control parameter.

In the acquiring step, information indicating vibration of the active vibration isolation apparatus may be further acquired as the teacher data.

The control parameter may include at least any one of an internal pressure of an air spring for lifting up a vibration isolation platform provided in the active vibration isolation apparatus, a drive amount of a servo valve for actively controlling the air spring, a target position of an air spring unit that includes the air spring, control feedback gain of the active vibration isolation apparatus, and a setting value for a filter provided in the active vibration isolation apparatus.

The state quantity may include at least any one of strength of a floor on which the industrial machine is installed via the active vibration isolation apparatus, a positional relationship between the industrial machine and another machine, mass of a workpiece, an ambient temperature of the industrial machine, wind pressure experienced by the industrial machine, sound surrounding the industrial machine, and vibration applied to the industrial machine.

What is claimed is:

1. A machine learning apparatus that determines a control parameter of an active vibration isolation apparatus on which an industrial machine is mounted, wherein
    the industrial machine includes a movable part, a drive source configured to drive the movable part, and a drive source control section configured to control the drive source to position the movable part at a command position,
    the machine learning apparatus comprising:
    an acquiring section configured to acquire, as teacher data, a positional deviation, which is a difference between the command position and an actual position of the movable part;
    a storage section configured to store a learning model configured to output the control parameter corresponding to a state quantity concerning the industrial machine; and
    a learning section configured to update the learning model using the teacher data.

2. The machine learning apparatus according to claim 1, further comprising:
    a control parameter determining section configured to determine the control parameter corresponding to the state quantity, using the learning model updated by the learning section; and
    an output section configured to output, to the active vibration isolation apparatus, the control parameter determined by the control parameter determining section.

3. The machine learning apparatus according to claim 1, wherein
    the acquiring section is configured to further acquire, as the teacher data, information indicating vibration of the active vibration isolation apparatus.

4. The machine learning apparatus according to claim 1, wherein
    the control parameter includes at least any one of an internal pressure of an air spring configured to lift up a vibration isolation platform provided in the active vibration isolation apparatus, a drive amount of a servo valve configured to actively control the air spring, a target position of an air spring unit that includes the air spring, control feedback gain of the active vibration isolation apparatus, and a setting value for a filter provided in the active vibration isolation apparatus.

5. The machine learning apparatus according to claim 1, wherein
    the state quantity includes at least any one of strength of a floor on which the industrial machine is installed via the active vibration isolation apparatus, a positional relationship between the industrial machine and another machine, mass of a workpiece, an ambient temperature of the industrial machine, wind pressure experienced by the industrial machine, sound surrounding the industrial machine, and vibration applied to the industrial machine.

6. The machine learning apparatus according to claim 1, wherein
    the drive source is a servo motor.

7. The machine learning apparatus according to claim 1, wherein
    the industrial machine is an ultra-high precision machine tool configured to machine a workpiece with a machine accuracy of 100 nm or less according to a machining command.

8. An industrial machine comprising the machine learning apparatus according to claim 1.

9. A machine learning method for determining a control parameter of an active vibration isolation apparatus on which an industrial machine is mounted, wherein
    the industrial machine includes a movable part, a drive source configured to drive the movable part, and a drive source control section configured to control the drive source to position the movable part at a command position,
    the machine learning method comprising:
    an acquiring step of acquiring, as teacher data, a positional deviation, which is a difference between the command position and an actual position of the movable part; and
    a step of updating a learning model using the teacher data, the learning model being configured to output the control parameter corresponding to a state quantity concerning the industrial machine.

10. The machine learning method according to claim 9, further comprising:

a step of determining the control parameter corresponding to the state quantity, using the learning model updated in the step of updating the learning model; and a step of outputting, to the active vibration isolation apparatus, the control parameter determined in the step of determining the control parameter.

11. The machine learning method according to claim 9, wherein in the acquiring step, information indicating vibration of the active vibration isolation apparatus is further acquired as the teacher data.

12. The machine learning method according to claim 9, wherein the control parameter includes at least any one of an internal pressure of an air spring configured to lift up a vibration isolation platform provided in the active vibration isolation apparatus, a drive amount of a servo valve configured to actively control the air spring, a target position of an air spring unit that includes the air spring, control feedback gain of the active vibration isolation apparatus, and a setting value for a filter provided in the active vibration isolation apparatus.

13. The machine learning method according to claim 9, wherein the state quantity includes at least any one of strength of a floor on which the industrial machine is installed via the active vibration isolation apparatus, a positional relationship between the industrial machine and another machine, mass of a workpiece, an ambient temperature of the industrial machine, wind pressure experienced by the industrial machine, sound surrounding the industrial machine, and vibration applied to the industrial machine.

* * * * *